United States Patent [19]
DeHoff

[11] 3,986,731
[45] Oct. 19, 1976

[54] REPAIR COUPLING

[75] Inventor: Robert Eugene DeHoff, Mount Joy, Pa.

[73] Assignee: AMP Incorporated, Harrisburg, Pa.

[22] Filed: Sept. 22, 1975

[21] Appl. No.: 615,663

[52] U.S. Cl. .............................. 285/81; 285/249; 285/356; 285/371
[51] Int. Cl.² ........................................ F16L 21/04
[58] Field of Search .............. 285/81, 82, 371, 343, 285/356, 247, 249, 250, 331

[56] References Cited
UNITED STATES PATENTS

| | | | |
|---|---|---|---|
| 546,314 | 9/1895 | Farrey | 285/371 X |
| 2,541,141 | 2/1951 | Woodling | 285/356 X |
| 2,755,110 | 7/1956 | Jacobs | 285/356 X |
| 3,091,483 | 5/1963 | Hruby, Jr. | 285/250 X |
| 3,454,290 | 7/1969 | Tairraz | 285/249 |
| 3,633,944 | 1/1972 | Hamburg | 285/81 |

FOREIGN PATENTS OR APPLICATIONS

| | | | |
|---|---|---|---|
| 40,656 | 4/1932 | France | 285/331 |
| 1,221,842 | 9/1962 | France | 285/81 |
| 876,408 | 8/1961 | United Kingdom | 285/250 |

*Primary Examiner*—Thomas F. Callaghan
*Attorney, Agent, or Firm*—Allan B. Osborne

[57] ABSTRACT

The present invention relates to a coupling useful for repairing broken or otherwise damaged tubing. More particularly the invention includes a coupling body member which accepts the cut ends of the tubing being repaired, a pair of washer-seals one for each tubing end and a pair of locking rams which drive the washer seals into the coupling body member and into an expanded fit thereby providing a secure fitting. The rams are threadably received into the coupling body member and locked thereon against unintentional reverse rotation.

1 Claim, 3 Drawing Figures

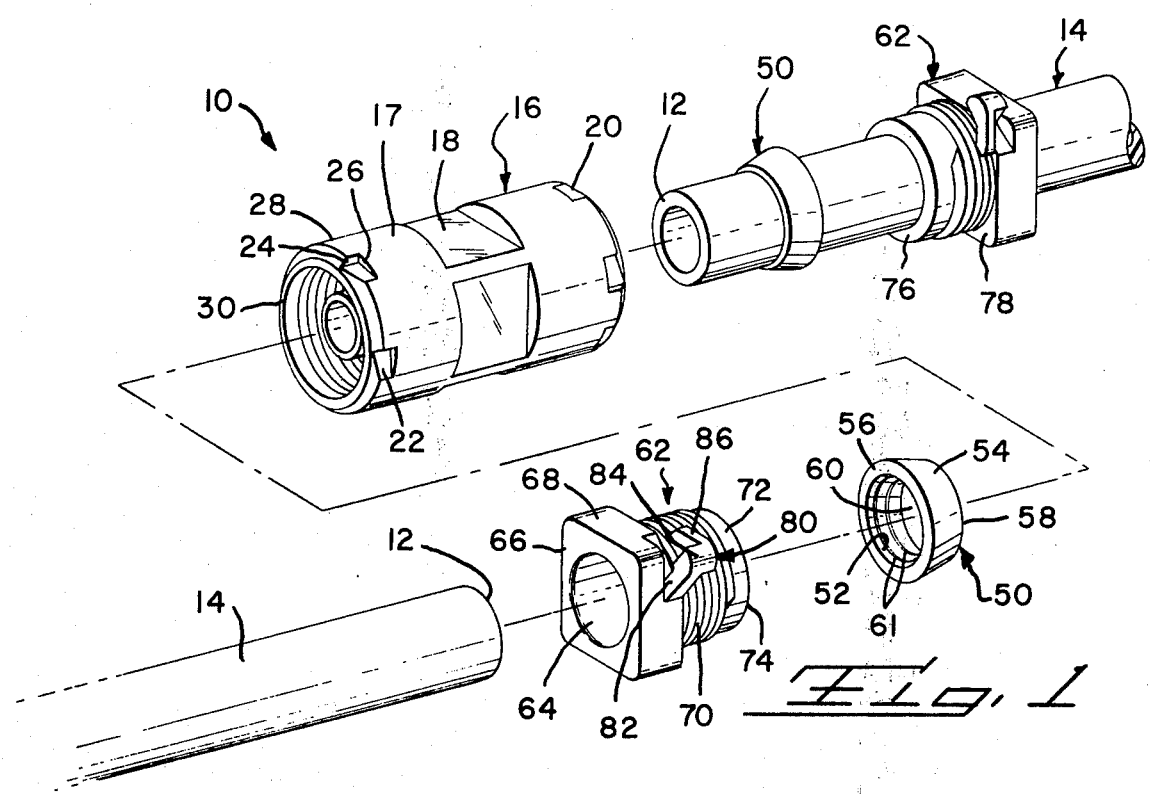
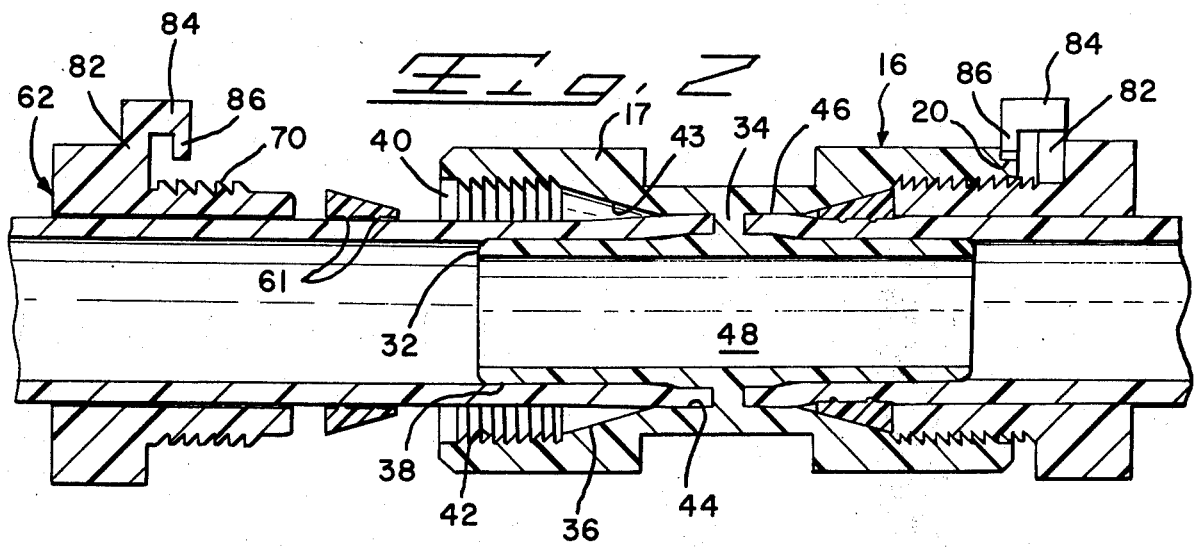
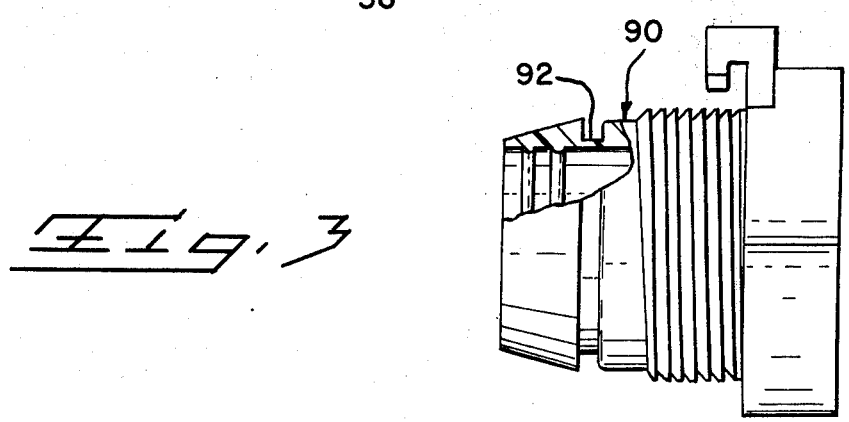

REPAIR COUPLING

BACKGROUND OF THE PRESENT INVENTION

Plastic tubing has gained wide acceptance in the building trade and more specifically in the mobile home industry where lightness is an important consideration. The use of plastic tubing however requires different types of fittings or alternatively, adaptors which allow the attachment of the plastic tubing to conventional faucets and the like. In addition, the use of plastic tubing, because of its higher susceptibility to damage, requires a need for repairing such. Conventional tubing repair devices failed to meet these requirements. The difficulties and safety requirements of plastic tubing gave rise to a large variety of methods and means ranging from adhesives to complex devices which require special tooling and skilled workmen. While the more complex devices are satisfactory the special tooling and skills needed foreclose their general acceptance. Further, the high cost of manufacturing limited their use.

Accordingly, the object of the present invention is to provide a repair coupling which is simple to install and does not require special tooling or adhesives.

Another object of the present invention is to provide a repair coupling which is reliable and inexpensive.

Still another object of the present invention is to provide a repair coupling containing means thereon to prevent unintentional separating of the repair coupling.

These and other objects, advantages and novel features of the present invention will be readily apparent from the following description and drawings.

BRIEF DESCRIPTION OF THE DRAWINGS

FIG. 1 is an exploded, perspective view of the repair coupling constructed in accordance with the present invention;

FIG. 2 is a cross-sectional elevational view of the repair coupling of FIG. 1 in its assembled mold; and FIG. 3 is another embodiment of the repair coupling constructed in accordance with the present invention.

DESCRIPTION OF THE PRESENT INVENTION AND ITS EMBODIMENTS

FIG. 1 shows in exploded fashion the repair coupling 10 of the present invention and the ends 12 of two separate pieces of tubing 14 which will be joined together via the coupling. The tubing may be of plastic or soft metal such as aluminum or thin copper. Tubing preparation includes cleaning by wiping and squaring off ends 12.

Repair coupling 10 consists of 5 pieces of which three are distinct and two are duplicates. The only non-duplicated element in an assembly is the central coupling body member 16 which is cylindrical and which is symmetrical from its middle outwardly in both directions. The external features of the coupling body member include flats 18 spaced about the circumference in the middle and notches 20 spaced about the circumference at each end. The notches are defined by a floor 22, a laterally facing vertical wall 24, and an axially facing wall 26. Wall 24 is orientated to face in a clockwise direction. The notches are cut into the outer edge 28 of each end 30 so that they are open in a direction looking axially away from the body member. The perimeter of the ends may be beveled as shown to facilitate assembly of the repair coupling.

The body member is molded to contain an inner tubular member 32 extending outwardly longitudinally towards the two ends 30. From the point of attachment in the middle of the body member, indicated by reference numeral 34, the inner surface 36 of the body member 16 and outer surface 38 of inner tubular member 32 define, at each end, an annular aperture or opening 40. From the ends 30 inwardly, the outer surface 38 of the inner tubular member 32 is straight and the inner surface 36 of the body member 16 contains internal threads 42 which end at a predetermined distance inwardly. From the inward end of the threads, the inner surface 36 continues, converging inwardly for a longitudinal distance until the space between the inner surface 36 and outer surface 38 is decreased to the approximate wall thickness of tubing 14. The beveled wall is indicated by reference numeral 43. The opening, now defining an annular groove 44 continues towards the middle of the cylindrical tube; i.e., mid-point 34, but its direction is preferably generally at a very gentle slope outwardly as indicated by reference numeral 46. The angle of the slope is about 5° relative to the longitudinal axis. A passageway 48 extends through inner tubular member 32 to provide a total passage through the body member. Coupling body member 16 may be molded from a thermoplastic acetal copolymer material sold under the tradename CELCON by the Celanese Company.

The repair coupling 10 further includes a pair of resilient, deformable washer seal members 50, one for either side of the body member 16. These seals are annular having an inside wall 52 and an outside wall 54. The thickness of the seal thins from its outer end 56 to the inner end 58 to provide a beveled outside wall 54. The inside wall is straight relative to the outside wall to provide a passageway 60 therethrough. Two ribs 61 project inwardly from the inside wall. Washer seals 50 may also be molded from CELCON.

The repair coupling 10 includes a pair of locking rams 62, one for either end of coupling body member 16. As with the body member and washer seal members, locking rams may be molded from CELCON. Internally the locking rams have a passageway 64. Externally the rams are squared-off adjacent the outer end 66 to provide a plurality of flats 68. The middle section of the locking rams contain external threads 70 which mate with threads 42 in the body member 16. Section 72, adjacent inner end 74, is reduced in its diameter relative to the flats 68. Face 76 of the inner end 74 is flat across.

Returning to the flats 68, and more particularly to the inside edge 78, attention is directed to one corner thereof which contains a locking prawl 80. The prawl consists of an arm 82 angling outwardly away from the locking ram, a link 84 paralleling the longitudinal axis of the ram and a foot 86 which wines or hooks back down toward the ram for a distance which places it on the floor 22 of the notches 20 when the coupling 10 is assembled.

With respect to assembling repair coupling 10, FIGS. 1 and 2 provide illustrations thereto. With the ends 12 of tubings 14 squared off, a locking ram 62 and washer seal 50 are slid onto each tubing in that order and back away from the end. Note that the inner end 58 of the washer seal faces towards end 12. This arrangement is shown on the right side of FIG. 1.

With the washer seal and locking ram back out of the way, the ends 12 of the tubings are inserted into openings 40, over inner tubular members 32 and pushed in until the ends 12 abut the bottom of annular grooves 44. The tubing ends are circumferentially widened due to the aforementioned outwardly sloping grooves. The stretching or widening of the tubing ends enhances the security of the assembly by creating compressive forces in tubing 14 which acting inwardly on the body member 16.

The washer seal and locking ram are now pushed forward into opening 40 until the threads 70 on the ram engages mating threads 42 in the opening. Using a wrench positioned on flats 68 the locking ram is rotated into the opening 40, driving the washer seal into a wedging relation between the beveled wall 43 and the outer surface of tubing 14. The washer seal 50 is laterally expanded or bulged out against the beveled wall 43 and tubing 14 creating a fluid tight seal making the assembly leak proof against relatively high pressures and further, additional compressive forces are created forcing ribs 61 into the tubing which restrain it from axial and rotational movement.

As the locking ram is being threaded into the body member 16, the locking prawl 80 rides over the several notches 20. The flexibility of the link 84 on the prawl permits it to act in the manner of a torsion bar so that foot 86 can accommodate the changes in height between the floor 22 and the outer edge 28 of the body member. However, counterclockwise movement is thwarted by the foot jamming into vertical wall 24 which, as was noted above, faces in a clockwise direction. Obviously, the repair coupling cannot become unthreaded except by deliberate action; i.e., by camming the foot up over walls 24 as the locking ram is backed out of opening 40.

In summary, the present invention provides a repair coupling assembly which locks the tubing into the body member by the combination of frictionally forcing the ends of the tubing into a laterally expanded condition and by laterally expanding the washer seal into a locking relation between the body member and the inner tubular member 32 which acts as a guide and a stiffener for the tubing being coupled. The performance of the present invention is demonstrated by tests which were applied. A pressure test had to be discontinued at 625 pounds per square inch when the tubing burst; the repair coupling was still holding. The same thing happened in a tensile test. The tubing failed at 425 pounds tensile.

FIG. 3 is a drawing of an embodiment of the present invention wherein the locking ram 62 and washer seal 50 are molded as a single unit 90. This unit has the same features as the individual pieces. As the figure shows the washer seal is connected to the locking ram by a short length of material indicated by reference numeral 92. The advantages of this embodiment lies in economy in molding, in handling and packaging and in disassembly. In the embodiment illustrated in FIGS. 1 and 2, the experience has been that the washer seal is so firmly seated in the opening 40 that its removal is quite difficult. This disadvantage is overcome by the unit shown in FIG. 3.

The foregoing detailed description has been given for clearness of understanding only, and no unnecessary limitations should be understood therefrom, as some modifications will be obvious to those skilled in the art.

What is claimed is:

1. A repair coupling for repairing or joining two pieces of tubing together, which comprises:
    a. a hollow body member being cylindrical and elongated and having therein an inner tubular member whose ends extend towards the ends of the body member and over which the tubing being joined can be positioned in close fitting relation, said inner tubular member and the inner surfaces of the body member defining outwardly facing annular openings, and further a portion of the inner surfaces of the body member being beveled such that said those inner surfaces are in a converging mode for a predetermined length;
    b. a pair of resilient deformable washer seal members each being annular with a beveled outer wall generally complementary with the beveled portion of the inner surfaces of the body member, said washer seal members being adapted to slidingly fit over the tubing being joined and to be received in the annular openings in the body member;
    c. a pair of locking rams each being hollow and having on one end a surface adapted to abuttingly engage a washer seal member, said rams also being adapted to slidingly fit over the tubing being joined and to be received in the annular openings in the body member;
    d. cooperating means in the annular openings and on the locking rams so that the locking rams can be drawn into the annular openings to ram the washer seal members into the beveled portion thereof whereby the washer seal members laterally expand compressively securing the tubing which may be positioned over the inner tubular members into the body member; and
    e. cooperating locking means for releasably locking the rams to the body member and including a plurality of notches spaced about the circumference of the body member at each end, said notches providing lateral walls facing in a clockwise direction, and a locking prawl extending outwardly from an edge on each of the rams, said prawls having a foot extending laterally therefrom so that with a ram threaded onto the body member, the foot abuts a lateral wall and prevents counterclockwise rotation of the ram.

* * * * *